(12) United States Patent
Paitod et al.

(10) Patent No.: US 10,802,717 B2
(45) Date of Patent: Oct. 13, 2020

(54) SYSTEMS AND METHODS FOR EFFICIENT FIRMWARE INVENTORY OF STORAGE DEVICES IN AN INFORMATION HANDLING SYSTEM

(71) Applicant: Dell Products L.P., Round Rock, TX (US)

(72) Inventors: Samir Paitod, Bangalore (IN); Santosh Gore, Bangalore (IN); Raveendra Babu Madala, Bangalore (IN); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/999,412

(22) Filed: Aug. 20, 2018

(65) Prior Publication Data

US 2020/0057568 A1    Feb. 20, 2020

(51) Int. Cl.
*G06F 12/00* (2006.01)
*G06F 13/00* (2006.01)
*G06F 3/06* (2006.01)
*G06F 8/60* (2018.01)

(52) U.S. Cl.
CPC ............ *G06F 3/0607* (2013.01); *G06F 3/067* (2013.01); *G06F 3/0653* (2013.01); *G06F 8/60* (2013.01)

(58) Field of Classification Search
CPC ...... G06F 3/0607; G06F 3/0653; G06F 3/067; G06F 8/06

USPC ......................................................... 711/161
See application file for complete search history.

(56) References Cited

U.S. PATENT DOCUMENTS

| | | | | |
|---|---|---|---|---|
| 4,153,951 A | * | 5/1979 | Slenkovich | G11C 8/04 365/239 |
| 6,189,050 B1 | * | 2/2001 | Sakarda | G06F 9/4411 709/220 |
| 7,779,130 B1 | * | 8/2010 | Toutonghi | H04L 67/06 709/227 |
| 8,369,502 B2 | * | 2/2013 | Hayakawa | H04L 29/06027 370/252 |
| 2002/0016792 A1 | * | 2/2002 | Ito | G06F 3/0601 |
| 2006/0221378 A1 | * | 10/2006 | Asahara | G03G 15/50 358/1.14 |
| 2007/0009382 A1 | * | 1/2007 | Bedingham | B01L 7/54 422/63 |

(Continued)

*Primary Examiner* — Sheng Jen Tsai
(74) *Attorney, Agent, or Firm* — Baker Botts L.L.P.

(57) ABSTRACT

A firmware inventory system for efficient firmware inventory of storage devices in an information handling system may include a first storage subsystem. The first storage subsystem may include a first set of storage devices, a first inventory information table, and a first expander. The expander may include a first memory, a first processor, and a first virtual SEP device stored in the first memory and executable by the first processor. The first virtual SEP device may, when a device change event is received from a first storage device of the first set of storage devices, send a device information request to the first storage device, receive a device information response including device information of the first storage device from the first storage device in response to the device information request and update the first inventory information table with the device information of the first storage device.

19 Claims, 8 Drawing Sheets

DEVICE INVENTORY INFORMATION PAYLOAD
800

| BIT<br>BYTE | 7 | 6 | 5 | 4 | 3 | 2 | 1 | 0 |
|---|---|---|---|---|---|---|---|---|
| 0 | PERIPHERAL QUALIFIER | | | | PERIPHERAL DEVICE TYPE | | | |
| 1-8 | VENDOR IDENTIFICATION | | | | | | | |
| 9-25 | PRODUCT IDENTIFICATION | | | | | | | |
| 26-28 | PRODUCT REVISION LEVEL | | | | | | | |
| 29-36 | DEVICE SERIAL NUMBER | | | | | | | |
| 37-40 | VENDOR SPECIFIC COMPONENT IDENTIFICATION | | | | | | | |
| 41 | DRIVE SLOT NUMBER | | | | | | | |
| 42 | ENCLOSURE BAY ID | | | | | | | |

(56) References Cited

U.S. PATENT DOCUMENTS

| | | | | |
|---|---|---|---|---|
| 2009/0135698 | A1* | 5/2009 | Fujibayashi | G06F 11/325 |
| | | | | 369/53.42 |
| 2009/0276643 | A1* | 11/2009 | Saito | G06F 1/30 |
| | | | | 713/300 |
| 2010/0295963 | A1* | 11/2010 | Shintani | H04N 5/2258 |
| | | | | 348/222.1 |
| 2011/0209134 | A1* | 8/2011 | Toda | G06F 8/654 |
| | | | | 717/170 |
| 2011/0276859 | A1* | 11/2011 | Baba | G06F 11/1092 |
| | | | | 714/770 |
| 2013/0198575 | A1* | 8/2013 | Etaati | G06F 11/0751 |
| | | | | 714/47.1 |
| 2013/0212429 | A1* | 8/2013 | Nakayama | G06F 11/1076 |
| | | | | 714/6.22 |
| 2013/0246702 | A1* | 9/2013 | Shigeta | G06F 12/0223 |
| | | | | 711/112 |
| 2014/0189202 | A1* | 7/2014 | Hosaka | G06F 12/0246 |
| | | | | 711/103 |
| 2017/0052721 | A1* | 2/2017 | Yamaji | G06F 3/061 |
| 2017/0132169 | A1* | 5/2017 | Nelogal | G06F 13/4239 |
| 2017/0279667 | A1* | 9/2017 | Culter | H04L 41/0672 |
| 2018/0095904 | A1* | 4/2018 | Bunker | G06F 13/4282 |
| 2018/0349234 | A1* | 12/2018 | Liu | G06F 11/1662 |

* cited by examiner

DEVICE INVENTORY INFORMATION HEADER
700

| BYTE | BIT 7 | 6 | 5 | 4 | 3 | 2 | 1 | 0 |
|---|---|---|---|---|---|---|---|---|
| 0 | (MSB) | | | VERSION INFORMATION | | | | |
| 3 | | | | | | | | (LSB) |
| 4 | (MSB) | | | NUMBER OF RECORDS | | | | |
| 7 | | | | | | | | (LSB) |
| 8 | STATE INDICATOR: STALE(1) OR UPDATED (0) | | | | | | | |

FIG. 8

DEVICE INVENTORY INFORMATION PAYLOAD
800

| BYTE | BIT 7 | 6 | 5 | 4 | 3 | 2 | 1 | 0 |
|---|---|---|---|---|---|---|---|---|
| 0 | PERIPHERAL QUALIFIER | | | PERIPHERAL DEVICE TYPE | | | | |
| 1-8 | VENDOR IDENTIFICATION | | | | | | | |
| 9-25 | PRODUCT IDENTIFICATION | | | | | | | |
| 26-28 | PRODUCT REVISION LEVEL | | | | | | | |
| 29-36 | DEVICE SERIAL NUMBER | | | | | | | |
| 37-40 | VENDOR SPECIFIC COMPONENT IDENTIFICATION | | | | | | | |
| 41 | DRIVE SLOT NUMBER | | | | | | | |
| 42 | ENCLOSURE BAY ID | | | | | | | |

SYSTEMS AND METHODS FOR EFFICIENT FIRMWARE INVENTORY OF STORAGE DEVICES IN AN INFORMATION HANDLING SYSTEM

BACKGROUND

Field of the Disclosure

This disclosure relates generally to information handling systems and, more particularly, to systems and methods for efficient firmware inventory of storage devices in an information handling system.

Description of the Related Art

As the value and use of information continues to increase, individuals and businesses seek additional ways to process and store information. One option available to users is firmware inventory systems. A firmware inventory system generally processes, compiles, stores, and/or communicates information or data for business, personal, or other purposes thereby allowing users to take advantage of the value of the information. Because technology and information handling needs and requirements vary between different users or applications, firmware inventory systems may also vary regarding what information is handled, how the information is handled, how much information is processed, stored, or communicated, and how quickly and efficiently the information may be processed, stored, or communicated. The variations in firmware inventory systems allow for firmware inventory systems to be general or configured for a specific user or specific use such as financial transaction processing, airline reservations, enterprise data storage, or global communications. In addition, firmware inventory systems may include a variety of hardware and software components that may be configured to process, store, and communicate information and may include one or more computer systems, data storage systems, and networking systems.

SUMMARY

In one embodiment, a disclosed firmware inventory system may include a first storage subsystem. The first storage subsystem may include a first set of storage devices, a first inventory information table, and a first expander. The expander may include a first memory, a first processor, and a first virtual SEP device stored in the first memory and executable by the first processor. The first virtual SEP device may, when a device change event is received from a first storage device of the first set of storage devices, send a device information request to the first storage device, receive a device information response including device information of the first storage device from the first storage device in response to the device information request, and update the first inventory information table with the device information of the first storage device.

In a number of the disclosed embodiments of the firmware inventory system, the device change event may comprise a physical link event that may indicate that the first storage device has been inserted in the first storage subsystem. The update of the first inventory information table may further include adding a first storage device entry including the device information of the first storage device to the first inventory information table.

In a number of the disclosed embodiments of the firmware inventory system, the device change event may comprise a physical link event that may indicate that the first storage device has been removed from the first storage subsystem. The update of the first inventory information table may further including remove a first storage device entry associated with the first storage device from the first inventory information table.

In a number of the disclosed embodiments of the firmware inventory system, each one of the first set of storage devices may further comprise device firmware. The device change event may comprise a device notification event that may indicate that the device firmware of the first storage device has been updated.

In a number of the disclosed embodiments of the firmware inventory system, the first expander may further comprise first expander firmware. The first virtual SEP device may further, when the first expander receives an expander firmware update event that may indicate that the first expander firmware has been updated, send a new device information request to each respective storage device of the first set of storage devices, receive a new device information response including new device information from each respective storage device of the first set of storage devices, add a new storage device entry including the new device information for each respective storage device to a new inventory information table, and replace the first inventory information table with the new inventory information table.

In a number of the disclosed embodiments of the firmware inventory system, the first virtual SEP device may further, when the first expander receives a first inventory information table request from an initiator application, send a new device information request to each respective storage device of the first set of storage devices, receive a new device information response including new device information from each respective storage device of the first set of storage devices, add a new storage device entry including the new device information for each respective storage device to the first inventory information table, save the first inventory information table, send a second inventory information table request to a second expander of a second storage subsystem of the firmware inventory system, receive a second inventory table from the second expander, merge the first inventory information table with the second inventory information table to create a merged inventory information table, and send the merged inventory information table to the initiator application in response to the first inventory information table request.

In a number of the disclosed embodiments of the firmware inventory system, the device information of each storage device entry of the first inventory information table may comprise a peripheral qualifier, a peripheral device type, a vendor identification, a product identification, a product revision level, a driver serial number, a vendor specific component identification, a drive slot number, and an enclosure bay identification.

In a second embodiment, a disclosed method may include, when a device change event may be received from a first storage device of a first set of storage devices of a first storage subsystem of a firmware inventory system, sending, by a first virtual SEP device of a first expander of the firmware inventory system, a device information request to the first storage device. The method may also include receiving, by the first virtual SEP device, a device information response including device information of the first storage device from the first storage device in response to the device information request. The method may further include updating, by the first virtual SEP device, a first inventory information table of the first storage subsystem with the device information of the first storage device.

In a number of the disclosed embodiments of the method, the device change event may comprise a physical link event that indicates that the first storage device has been inserted in the first storage subsystem. Updating the first inventory information table may further include adding a first storage device entry including the device information of the first storage device to the first inventory information table.

In a number of the disclosed embodiments of the method, the device change event may comprise a physical link event that indicates that the first storage device has been removed from the first storage subsystem. Updating the first inventory information table may further include removing a first storage device entry associated with the first storage device from the first inventory information table.

In a number of the disclosed embodiments of the method, each one of the first set of storage devices may further include device firmware. The device change event may comprise a device notification event that may indicate that the device firmware of the first storage device may have been updated.

In a number of the disclosed embodiments of the method, the method may also include, when an expander firmware update event may have been received that may indicate that first expander firmware of the first expander may have been updated, sending a new device information request to each respective storage device of the first set of storage devices, receiving a new device information response including new device information from each respective storage device of the first set of storage devices, adding a new storage device entry including the new device information for each respective storage device to a new inventory information table, and replacing the first inventory information table with the new inventory information table.

In a number of the disclosed embodiments of the method, the method may also include, when a first inventory information table request from an initiator application may have been received, sending a new device information request to each respective storage device of the first set of storage devices, receiving a new device information response including new device information from each respective storage device of the first set of storage devices, adding a new storage device entry including the new device information for each respective storage device to the first inventory information table; saving the first inventory information table, sending a second inventory information table request to a second expander of a second storage subsystem of the firmware inventory system, receiving a second inventory table from the second expander, merging the first inventory information table with the second inventory information table to create a merged inventory information table, and sending the merged inventory information table to the initiator application in response to the first inventory information table request.

In a number of the disclosed embodiments of the method, the device information of each storage device entry of the first inventory information table may include a peripheral qualifier, a peripheral device type, a vendor identification, a product identification, a product revision level, a driver serial number, a vendor specific component identification, a drive slot number, and an enclosure bay identification.

In a third embodiment, a disclosed firmware inventory system may include a storage subsystem. The storage subsystem may include a set of storage devices, an inventory information table, and a storage controller. The storage controller may include a firmware inventory module stored in a memory of the storage controller and executable by a processor of the storage controller. When the storage controller may receive a device change event from a first storage device of the set of storage devices that may indicate that device firmware of the first storage device has been updated, the firmware inventory module may send a device information request to the first storage device, receive a device information response including device information of the first storage device from the first storage device in response to the device information request, and update the inventory information table with the device information of the first storage device.

In a number of the disclosed embodiments of the firmware inventory system, prior to the device information request being sent to the first storage device, the firmware inventory module may update a state indicator of the inventory information table to a stale value that may indicate that the inventory information table may be stale. After the inventory information table has been updated with the device information, the firmware inventory Module may update the state indicator of the inventory information table to an updated value that may indicate that the inventory information table may be updated.

In a number of the disclosed embodiments of the firmware inventory system, the firmware inventory module may further, when the storage controller receives the device change event that may indicate that the first storage device has been inserted in the storage subsystem, send the device information request to the first storage device, receive the device information response including device information of the first storage device from the first storage device in response to the device information request, and add a first storage device entry including the device information of the first storage device to the inventory information table.

In a number of the disclosed embodiments of the firmware inventory system, the firmware inventory module may further, when the storage controller may receive the device change event that may indicate that the first storage device may have been removed from the storage subsystem, remove a first storage device entry associated with the first storage device from the inventory information table.

In a number of the disclosed embodiments of the firmware inventory system, the device information of each storage device entry of the first inventory information table may include a peripheral qualifier, a peripheral device type, a vendor identification, a product identification, a product revision level, a driver serial number, a vendor specific component identification, a drive slot number, and an enclosure bay identification.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, 5, 6, 7, 8, and 9 wherein like numbers are used to indicate like and corresponding parts.

Figure 1:
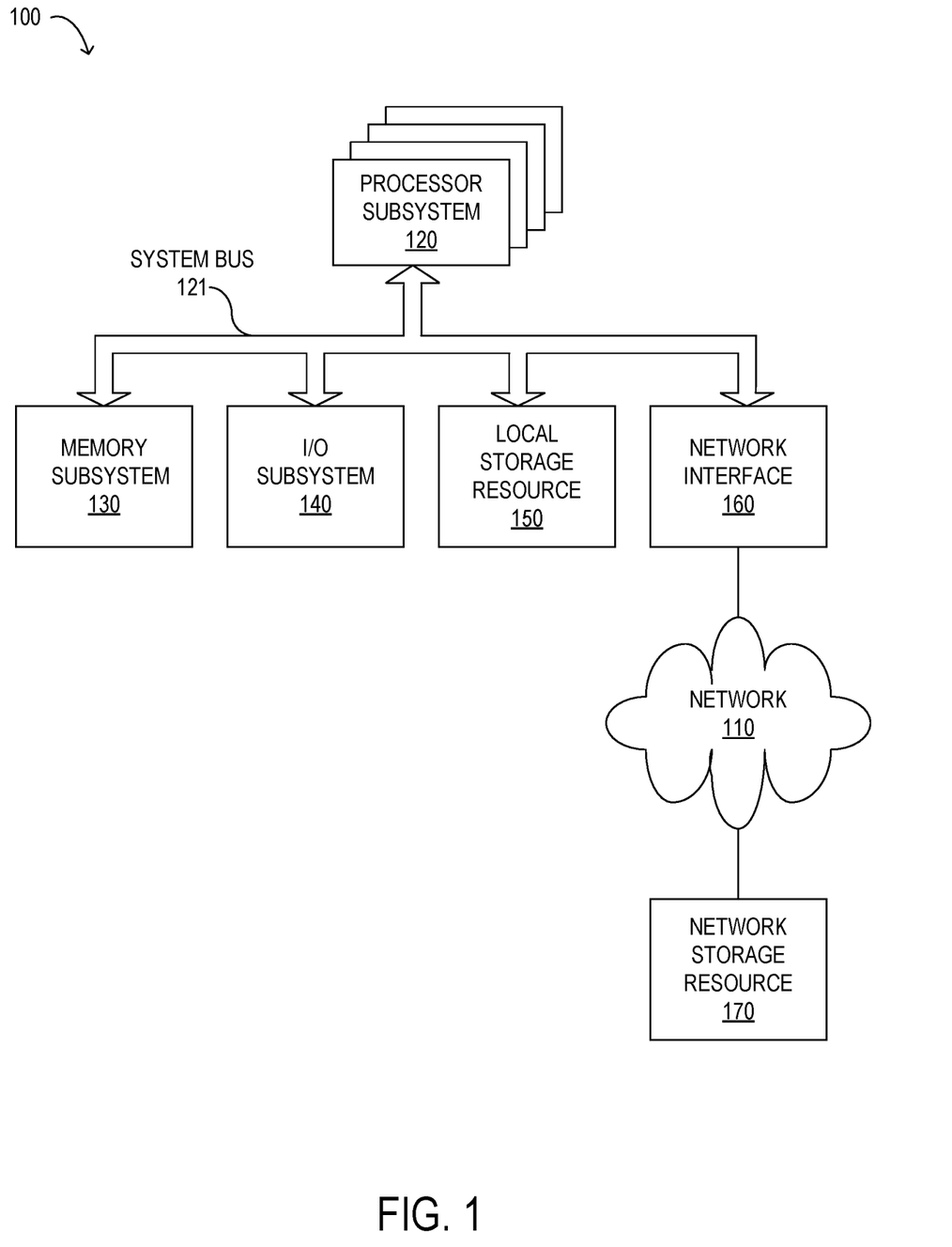
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organzers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a. LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

A storage controller may provide a firmware inventory of storage devices within an information handling system. To provide a firmware inventory of storage devices connect to an enclosure or backplane behind a RAID or non-RAID controller requires the storage controller to send an inquiry command to each of the storage devices at the time of the firmware inventory. This may require a significant amount of time to complete. The storage controller may maintain a cache of inventory data for storage devices but the cache may not have the latest state of the storage device. In a typical cache implementation, the storage controller stores virtual product data (VPD) pages which are used to read supported download types (e.g. Segmented Download, Deferred Download, etc.) by the target. When the storage device firmware is upgraded, these values may change with the storage device firmware upgrade. However, the cache of the inventory data may not be updated until a reset or time bound event. Due to this limitation, an initiator application has to specifically send a command to inquire supported download mechanisms or use some other alternatives such as reading encoded values from firmware images to obtain current inventory data of a storage de-Ace.

In order to perform a firmware upgrade of a storage device, a firmware upgrading application requires the active running firmware revision and capabilities on the storage device. This firmware upgrading application cannot rely on stale inventory data cached by the storage controller. Since the use of cached inventory data cannot be trusted for upgrading firmware, the firmware upgrading applications have to perform an inventory command on each individual storage device. In some scenarios (e.g. after a disk firmware upgrade), system management applications like OMSS/iDRAC may not be updated quickly enough to reflect these changes. These problems become worse when these enclosures and expanders are daisy chained. The firmware inventory also causes performance issues in the firmware updating applications as the number of inquiry commands that are being sent increases as the number of enclosures and associated storage devices increases.

As will be described in further detail herein, the inventors of the present disclosure have discovered systems and methods for efficient firmware inventory of storage devices in an information handling system. In the present solution, a firmware inventory system may include a storage subsystem. The storage subsystem may include a set of storage devices, an inventory information table, and an expander. The expander may include a memory, a processor, and a virtual SEP device stored in the memory and executable by the processor. When a physical link event is received from a storage device of the set of storage devices, the virtual SEP device may send a device information request to the storage device, receive a device information response including device information of the storage device from the storage device in response to the device information request, and update the inventory information table with the device information of the storage device. By having the expander receiving the physical link events directly from the storage devices, the expander may create and maintain an inventory information table that is up to date, a firmware inventory of all of the storage devices present in the system is provided in a minimum amount of time. This solution also scales well as the number of connected storage devices increases. System boot performance will increase as the performance of collect system inventory on reboot (CSIOR) is increased, system upgrade downtime may be reduced, the number of commands required to collect the device inventory information may be reduced, the business logic of hardware monitoring applications may be simplified, and the usage of an inventory information table, cache, may be increased.

Figure 2:
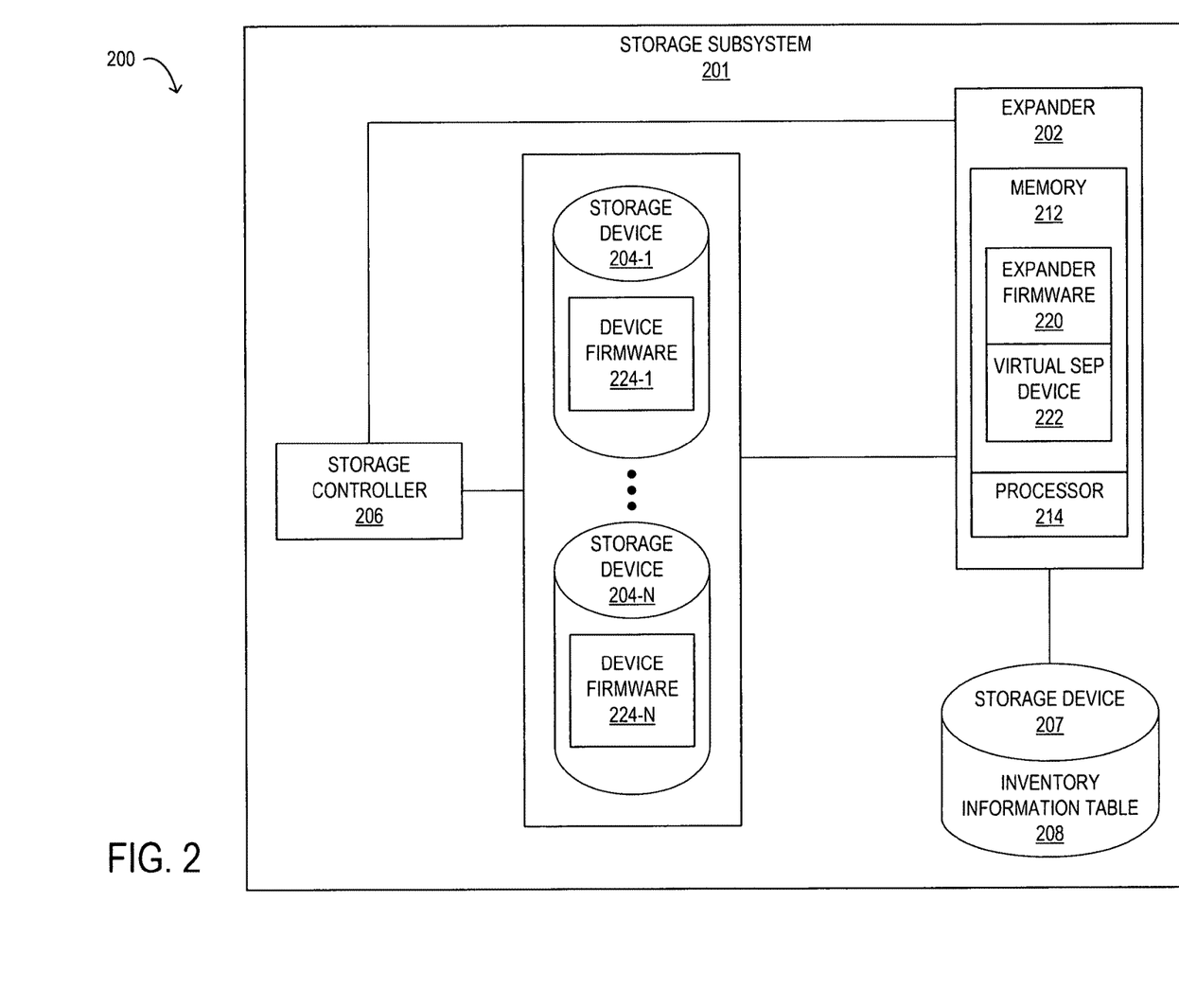
FIG. 2 is a block diagram of selected elements of an embodiment of an exemplary firmware inventory system for efficient firmware inventory of storage devices.

Turning now to FIG. 2, a block diagram of selected elements of an embodiment of an exemplary firmware inventory system 200 for efficient firmware inventory of storage devices is illustrated. As shown in FIG. 2, components of firmware inventory system 200 may include, but are not limited to, a storage subsystem 201. Storage subsystem 201 may include an expander 202, a set of N storage devices 204 including storage devices 204-1 and 204-N, a storage controller 206, a storage device 707, and an inventory information table 208 stored in storage device 207. In one or more embodiments, N may be equal to or greater than 1. Each of expander 202 and storage controller 206 may comprise information handling system 100.

As shown, expander 202 may include a memory 212, a processor 214, expander firmware 220, and a virtual SEP device 222. Expander firmware 220 and virtual SEP device 222 may both be stored in memory 212. Virtual SEP device 222 may be on an expander backplane of expander 202. Expander 202 may be coupled to storage devices 204, storage controller 206, and inventory information table 208. Expander 202 may be operable to create and maintain inventory information table 208, keep inventory information table 208 up to date, and provide a method for firmware inventory applications (not shown) to read inventory information table 208, described in further detail below. Expander 202 may also include an inter-integrated circuit (I2C) interface, which may be utilized by Expander 202 to communicate with one or more complex programmable logic devices (CPLDs) associated with the set of N storage devices 204 to access device presence bits of the one or more CPLDs. Each presence bit of the device presence bits may be associated with a respective storage device 204 of the set of N storage devices 204 and may indicate if the respective storage device 204 is present in storage subsystem 201. Expander 202 may use the device presence bits in building and maintaining inventory information table 208.

Each storage device 204 may comprise computer-readable media (e.g., hard disk drive, floppy disk drive, and/or other type of rotating storage media, flash memory, and/or another type of solid state storage media) and may be generally operable to store instructions and/or data. The set of N storage devices 204 may be one or more redundant array of independent disks (RAIDs), just a bunch of disks (JBODs), or combinations thereof. Each storage device 204 of the set of N storage devices 204 may also include device firmware 224. As shown, storage device 204-1 may include device firmware 224-1 and storage device 204-N may include device firmware 224-N. A firmware update application (not shown) may perform firmware upgrades of each respective device firmware 224 associated with each respective storage device 204 of the set of N storage devices 204.

Storage device 207 may comprise a computer-readable media such as a hard disk drive, a floppy disk drive, and/or another type of rotating storage media, a flash memory, and/or another type of solid state storage media and may be generally operable to store instructions and/or data. As shown in FIG. 2, inventory information table may be stored in storage device 207.

Figure 3:
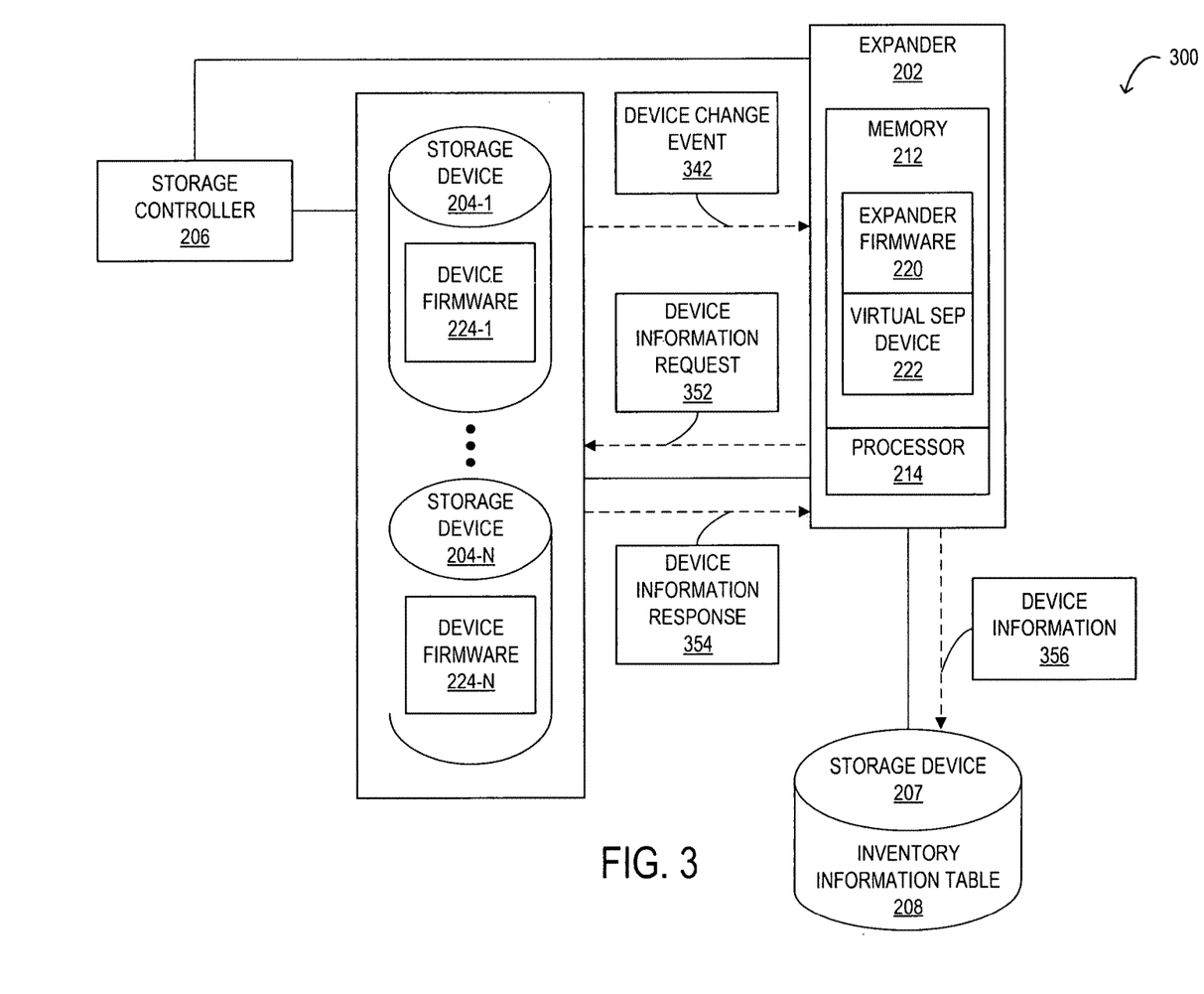
FIG. 3 is a flow diagram depicting selected elements of an embodiment of an exemplary method for efficient firmware inventory of storage devices in a firmware inventory system including an expander.

Referring now to FIG. 3, a flow diagram 300 of selected elements of an embodiment of an exemplary method for efficient firmware inventory of storage devices in firmware inventory system 200 including expander 202, described above with reference to FIG. 2, is illustrated.

During operation, a device change event 342 may occur. Device change event 342 may be associated with a storage device 204 such as storage device 204-1 of the set of N storage devices 204. Storage device 204-1 may provide device change event 342 to Expander 202. When expander 202 receives device change event 342 from storage device 204-1, virtual SEP device 222 may send a device information request 352 to storage device 204-1. Storage device 204-1 may gather current device information associated with storage device 204, create a device information response 354 including the current device information, and send device information response 354 to expander 202. Virtual SEP device 222 may receive device information response 354 including the current device information of storage device 204-1 from storage device 204-1 in response to device information request 352. Virtual SEP device 222 may update inventory information table 208 with the current device information of storage device 204-1.

When device change event 342 comprises a physical link event that may indicate that storage device 204-1 has been inserted in storage subsystem 201, the update of inventory information table 208 may include adding a storage device entry associated with storage device 204-1 to inventory information table 208. For example, virtual SEP device 222 may read the storage device presence bit associated with storage device 204-1 from the associated CPLD and will initiate inquiry for the respective drive slot associated with storage device 204-1. When storage device 204-1 has been inserted in storage subsystem 201, the associated storage device presence bit indicates the presence of storage device 204-1 in storage subsystem 201.

When device change event 342 comprises a physical link event that indicates that storage device 204-1 has been removed from storage subsystem 201, the update of inventory information table 208 may include removing a storage device entry associated with storage device 204-1 from inventory information table 208. For example, virtual SEP device 222 may read the storage device presence bit associated with storage device 204-1 from the associated CPLD and will initiate inquiry for the respective drive slot associated with storage device 204-1. When storage device 204-1 has been removed from storage subsystem 201, the associated storage device presence bit indicates storage device 204-1 is not present in storage subsystem 201. In one or more embodiments, when storage device 204-1 comprises a non-volatile memory express (NVME) storage device, expander 202 may have a translation layer that may convert the inquiry command to an identify command.

When device change event 342 comprises a device notification event that indicates that device firmware 224-1 of storage device 204-1 has been updated, the update of inventory information table 208 may include updating a storage device entry associated with storage device 204-1 by replacing the stale device information of storage device 204-1 of the storage device entry with the current device information of storage device 204-1 at the storage device entry associated with storage device 204-1. In one or more embodiments, the device notification event may be from a sense line of a storage device 204 that occurs the next time expander 202 accesses storage device 204-1. The storage device 204 may send an asynchronous broadcast serial attached SCSI (SAS), small computer system interface (SCSI), primitive to be interpreted by expander 202. Expander 202 may also act as a storage service provider (SSP) initiator that may issue SCSI inquiry commands to a storage device 204 and refresh the drive firmware revision information associated with the storage device 204.

Figure 4:
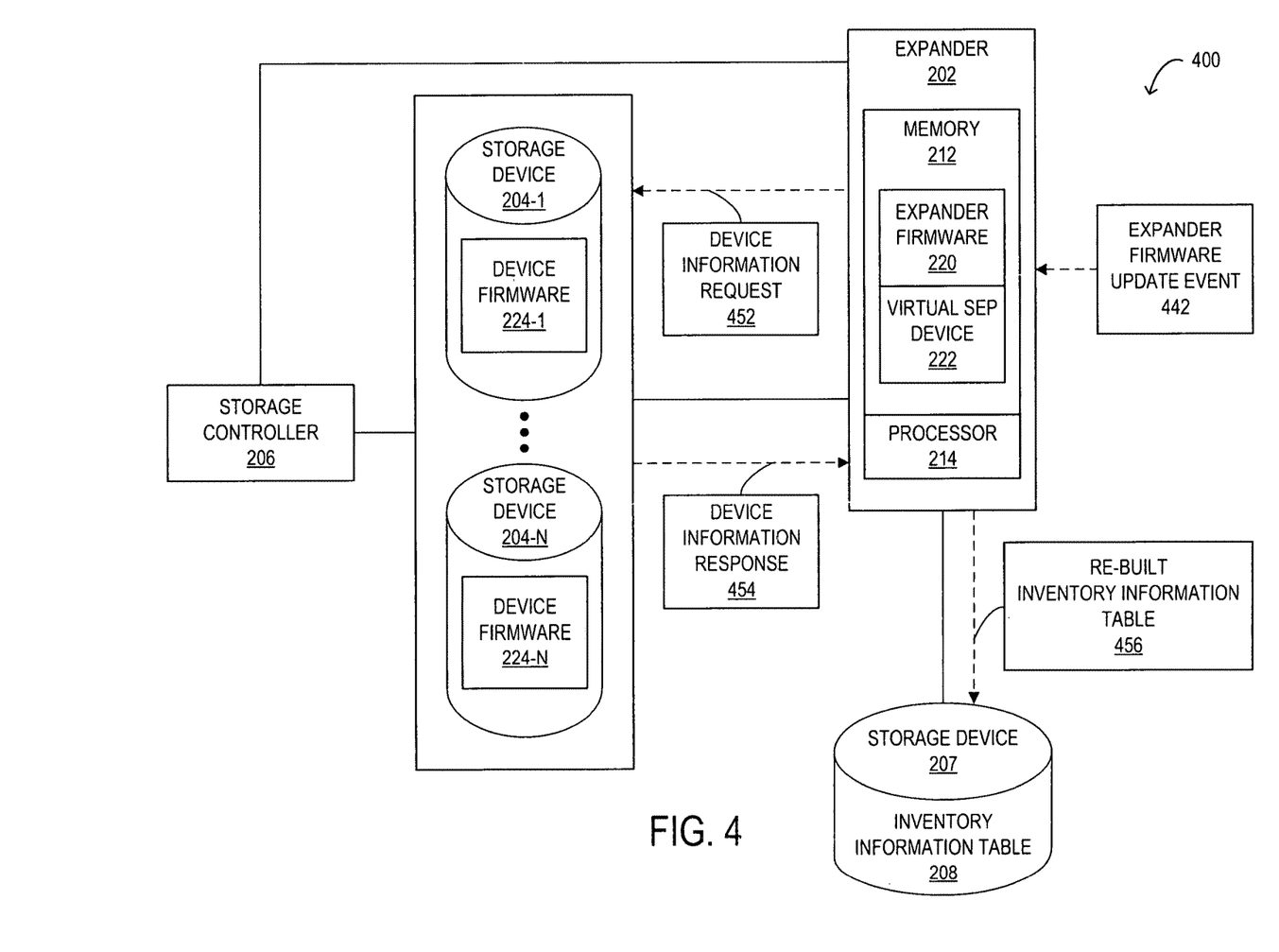
FIG. 4 is a second flow diagram depicting selected elements of an embodiment of an exemplary method for efficient firmware inventory of storage devices in a firmware inventory system including an expander.

Referring now to FIG. 4, a second flow diagram of selected elements of an embodiment of an exemplary method for efficient firmware inventory of storage devices in a firmware inventory system 400 including an expander is illustrated. Firmware inventory system 400 is structurally and functionally similar to firmware inventory system 200, described above with reference to FIG. 2. Similar to firmware inventory system 200, components of firmware inventory system 400 may include, but are not limited to, expander 202, the set of N storage devices 204, storage controller 206, storage device 707, and inventory information table 208 stored in storage device 207, as described above.

During operation, an expander firmware update event 442 may occur. Expander firmware update event 442 may indicate that expander firmware 220 of expander 202 has been updated. When expander 202 receives expander firmware update event 442 indicating that expander firmware 220 of expander 202 has been updated, expander 202 may re-build inventory information table 208 based on the current set of device information of storage devices 204 of storage subsystem 201. Virtual SEP device 222 may send each respective storage device 204 of the set of storage devices 204 currently present in storage subsystem 201 a respective device information request 452. Each storage device 204 may gather current device information associated with each storage device 204. Each storage device 204 may create a device information response 454 including the current device information associated with each storage device 204 and send each device information response 454 associated with each storage device 204 to expander 202. When expander 202 receives each device information response 454 including the current device information associated with each storage device 204, virtual SEP device 222 may add a storage device entry including the current device information associated with each respective storage device 204 to a new inventory information table 208 stored at memory 212 of expander 202. When the new inventory information table 208 has every storage device entry associated with each storage device 204 currently present in storage subsystem 201, virtual SEP device 222 may replace inventory information table 208 on storage device 207 with the new inventory information table 208.

Figure 5:
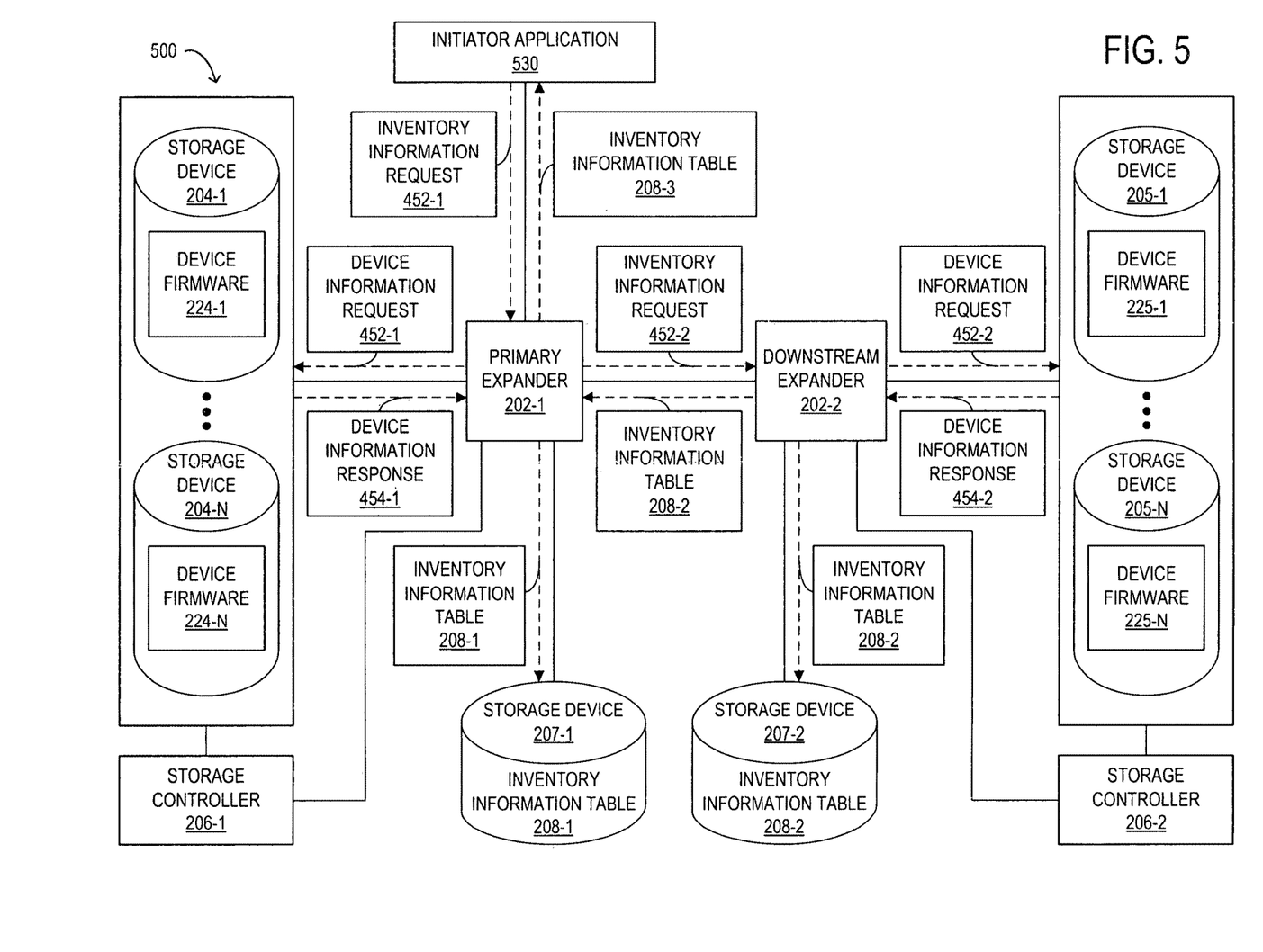
FIG. 5 is a third flow diagram depicting selected elements of an embodiment of an exemplary method for efficient firmware inventory of storage devices in a firmware inventory system including an expander.

Referring now to FIG. 5, a third flow diagram of selected elements of an embodiment of an exemplary method for efficient firmware inventory of storage devices in a firmware inventory system 500 including an expander is illustrated. Components of firmware inventory system 500 may include, but are not limited to, a primary expander 202-1, a downstream expander 202-2, a set of storage devices 204, a set of storage devices 205, a storage controller 206-1, a storage controller 206-2, a storage device 707-1, an inventory information table 208-1 stored in storage device 207-1, a storage device 707-2, and an inventory information table 208-2 stored in storage device 207-2, and an initiator application 530. Primary expander 202-1, downstream expander 202-2, storage controller 206-1, storage controller 206-2, storage device 707-1, storage device 707-2, inventory information table 208-1, and inventory information table 208-2 are described above with reference to FIG. 2. Each storage device 205 of the set of storage devices 205 including device firmware 225 are structurally and functionally similar to storage device 204 including device firmware 224 described above.

During operation, initiator application 530 may send primary expander 202-1 an inventory information request 452-1 to retrieve current inventory information for every storage device 204 and every storage device 205 present in firmware inventory system 500. When primary expander 202-1 receives inventory information request 452-1 from initiator application 530, primary expander 202-1 may build an inventory information table 208-3 based on the current set of device information associated with every storage device 204 and every storage device 205 present in firmware inventory system 500. Inventory information table 208-3 may be built during system boot, system startup, or another appropriate time. Described in further detail below.

When primary expander 202-1 receives inventory information request 452-1 from initiator application 530, virtual SEP device 222-1 of primary expander 202-1 may send each respective storage device 204 of the set of storage devices 204 currently present in firmware inventory system 500 a respective device information request 452-1. Each storage device 204 may gather current device information associated with each storage device 204. Each storage device 204 may create a device information response 454-1 including the current device information associated with each storage device 204 and send each device information response 454-1 associated with each storage device 204 to primary expander 202-1. When primary expander 202-1 receives device information response 454-1 including the current device information from each storage device 204 of the set of storage devices 204, virtual SEP device 222-1 may add a storage device entry including the current device information associated with each respective storage device 204 to an inventory information table 208-1 stored at memory 212-1 of primary expander 202-1. When inventory information table 208-1 stored at memory 212-1 has every storage device entry associated with every respective storage device 204 currently present in storage subsystem 201-1, virtual SEP device 222-1 may save inventory information table 208-1 stored at memory 212-1 on storage device 207-1. Virtual SEP device 222-1 may send an inventory information request 452-2 to downstream expander 202-2.

When downstream expander 202-2 receives inventory information request 452-2 from primary expander 202-1, virtual SEP device 222-2 of downstream expander 202-2 may send each respective storage device 205 of the set of storage devices 205 currently present in storage subsystem 201-2 a respective device information request 452-2. Each storage device 205 may gather current device information associated with each storage device 205. Each storage device 205 may create a device information response 454-2 including the current device information associated with each storage device 205 and send each device information response 454-2 associated with each storage device 205 to downstream expander 202-2. When downstream expander 202-2 receives device information response 454-2 including the current device information from each storage device 205 of the set of storage devices 205, virtual SEP device 222-2 may add a storage device entry including the current device information associated with each respective storage device 205 to an inventory information table 208-2 stored at memory 212-2 of downstream expander 202-2. When inventory information table 208-2 stored at memory 212-2 has every storage device entry associated with every respective storage device 205 currently present in storage subsystem 201-2, virtual SEP device 222-2 may save inventory information table 208-2 stored at memory 212-2 on storage device 207-2. Virtual SEP device 222-2 may send inventory information table 208-2 stored at memory 212-2 to primary expander 202-1 in response to inventory information request 452-2.

When primary expander 202-1 receives inventory information table 208-2, virtual SEP device 222-1 may merge inventory information table 208-1 stored at memory 212-1 with inventory information table 208-2 received from downstream expander 202-2 to create a merged inventory information table 208-3. Virtual SEP device 222-1 may send inventory information table 208-3 to initiator application 530 in response to inventory information request 452-2.

In one or more embodiments, firmware inventory system 500 may include more than one downstream expander 202 and more than one set of storage devices 205 associated with each of the more than one downstream expanders 202. Each set of the more than one set of storage devices 205 may each have different numbers of storage devices 205 than the other sets of storage devices, or each set may have the same number of storage devices 205, which may also be the same number of storage devices 204 of the set of N storage devices 204 of firmware inventory system 500. In one or more embodiments, initiator application 530 may comprise a board management controller (BMC) initiator application of a BMC that may be used to update the BMC's software inventory based on an inventory information table 208 of firmware inventory system 500.

Figure 6:
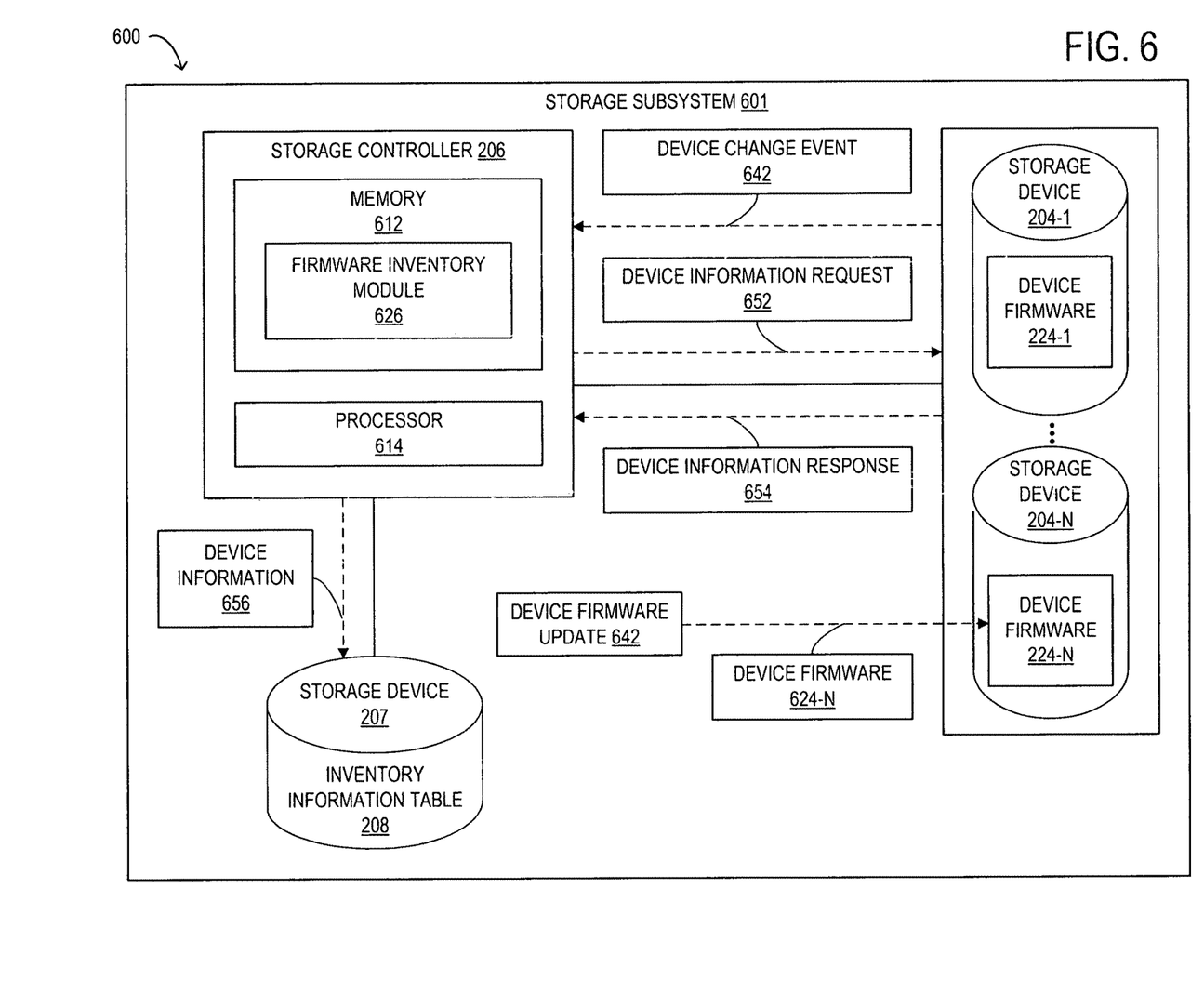
FIG. 6 is a flow diagram depicting selected elements of an embodiment of an exemplary method for efficient firmware inventory of storage devices in a firmware inventory system including a storage controller.

Referring now to FIG. 6, is a flow diagram depicting selected elements of an embodiment of an exemplary method for efficient firmware inventory of storage devices in a firmware inventory system 600 including a storage controller. Components of firmware inventory system 600 may include, but are not limited to, a set of storage devices 204, a storage controller 206, a storage device 707, an inventory information table 208 stored on storage device 207, and a device firmware update application 642. Each storage device 204 of the set of storage devices 204 may include respective device firmware 224. Storage devices 204 and each associated device firmware 224, storage controller 206, storage device 707, and inventory information table 208 are described above with reference to FIG. 2. Storage controller 206 may further include a memory 612, a processor 614, and a firmware inventory module 626 stored at memory 612 and executable by processor 614.

During operation, device firmware update application 642 may update device firmware 224-N of storage device 204-N with device firmware 624-N utilizing a firmware upgrade procedure. Once the device firmware update of storage device 204-N has been completed, storage device 204-N may send a device change event 642 to storage controller 206 that may indicate that device firmware 224-N of storage device 204-N has been updated. Storage device 204-N may send device change event 642 by generating a request sense. When controller 206 receives device change event 642, firmware inventory module 626 may send a device information request 652 to storage device 204-N. Storage device 204-N may gather current device information associated with storage device 204-N, create a device information response 654 including the current device information and send device information response 654 to storage controller 206 in response to device information request 652. When controller 206 receives device information response 654 including the current device information from storage device 204-N in response to device information request 652, firmware inventory module 626 may update a storage device entry associated with storage device 204-N of inventory information table 208 with the current device information associated with storage device 204-N.

In one or more embodiments, prior to device information request 652 being sent to storage device 204-N, firmware inventory module 626 may update a state indicator of inventory information table 208 to a stale value that indicates that inventory information table 208 is stale. After the storage device entry associated with storage device 204-N of inventory information table 208 has been updated, firmware inventory module 626 may update the state indicator of inventory information table 208 to an updated value that indicates that inventory information table 208 has been updated. An initiator application such as initiator application 530 of FIG. 5 may access the state indicator of inventory information table 208 to determine the state of inventory information table 208. When the state indicator is set to the stale value, the initiator application may wait until the state indicator has been updated to the updated value so that the initiator application may request an up to date inventory information table 208.

In one or more embodiments, firmware inventory module 626 of storage controller 206 may monitor disk microcode update event for a device firmware upgrade and update the storage device entry of inventory information table 208 by re-inquiring the storage device. Firmware inventory module 626 may monitor the storage device update by listening to the drive request set by the storage device 204 after device firmware 224-N has been updated with a key value of soft error set to 2, sense code value set to 3Fh, and sense code qualifier value set to 01h. This event is referred to as "MICROCODE has been changed" event. Firmware inventory module 626 can read this request sense by storage device 204 and update the storage device entry associated with storage device 204 of inventory information table 208 by sending an inquiry command to storage device 204. Firmware inventory module 626 may set the state indicator of inventory information table 208 to the stale value while inventory information table 208 is being updated. This allows initiator applications to wait while firmware inventory module 626 of storage controller 206 is updating inventory information table 208. In addition, applications such as an open manage storage systems (OMSS) application may subscribe to the status of the state indicator of inventory information table 208 to keep its user interface (UI) updated.

When storage controller 206 receives device change event 642 indicating that storage device 204-1 has been inserted into storage subsystem 601, firmware inventory module 626 may send a device information request 652 to storage device 204-1. Storage device 204-1 may gather device information associated with storage device 204-1, create a device information response 654 including the device information, and send device information response 654 to storage controller 206 in response to device information request 652. When storage controller 206 receives device information response 654 including the device information from storage device 204-1 in response to device information request 652, firmware inventory module 626 may add a storage device entry associated with storage device 204-1 to inventory information table 208.

When storage controller 206 receives device change 642 event indicating that storage device 204-1 has been removed from storage subsystem 601, firmware inventory module 626 may remove a storage device entry associated with storage device 204-1 from inventory information table 208.

Figure 7:
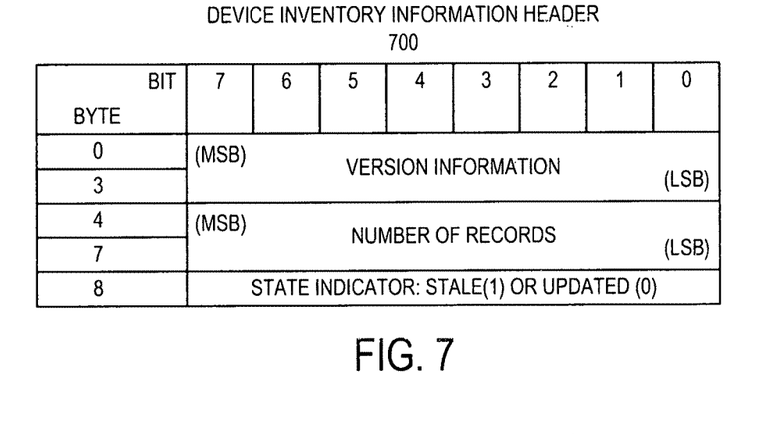
FIG. 7 is a block diagram of selected elements of an embodiment of an exemplary header of an inventory information table.

Turning now to FIG. 7, a block diagram of selected elements of an embodiment of an exemplary device inventory information header 700 of an inventory information table 208 is depicted. Device inventory information header 700 may include, but is not limited to, version information associated with inventory information table 208, a number of records, storage device entries, in inventory information table 208, and a state indicator of inventory information table 208. In FIG. 7, inventory information header 700 is arranged with the version information and the number of records each occupying 4 bytes with the most significant bit of each byte on the left side and the least significant bit of each byte on the right side of device inventory information header 700. The state indicator may have a value of 1 indicating that inventory information table 204 is stale or a value of 0 indicating that inventory information table 208 is updated. It will be understood that device inventory information header 700 may have other appropriate arrangements and may use other appropriate values to indicate the state of inventory information table 208.

Figure 8:
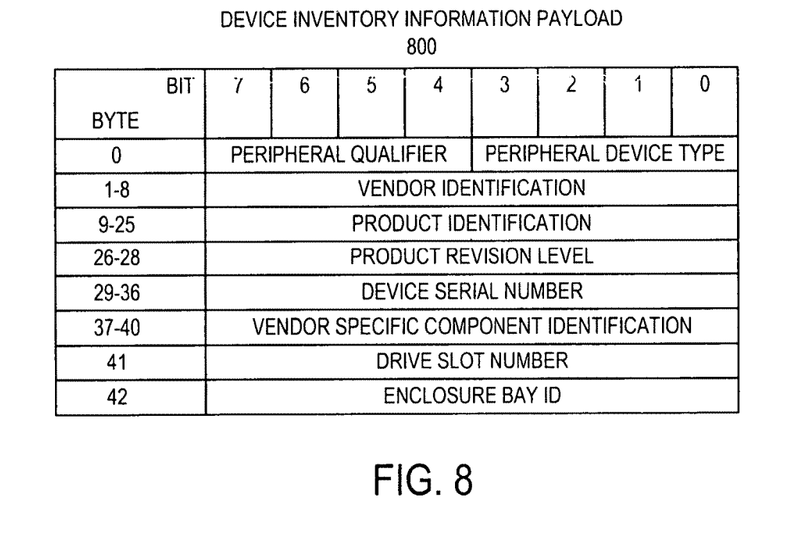
FIG. 8 is a block diagram of selected elements of an embodiment of an exemplary storage device entry of an inventory information table.

Turning now to FIG. 8, a block diagram of selected elements of an embodiment of an exemplary device inventory information payload 800 of a storage device entry of an inventory information table 208 is illustrated. Device inventory information payload 800 may include, but is not limited to, a peripheral qualifier, a peripheral device type, a vendor identification, a product identification, a product revision level, a driver serial number, a vendor specific component identification, a drive slot number, and an enclosure bay identification.

Figure 9:
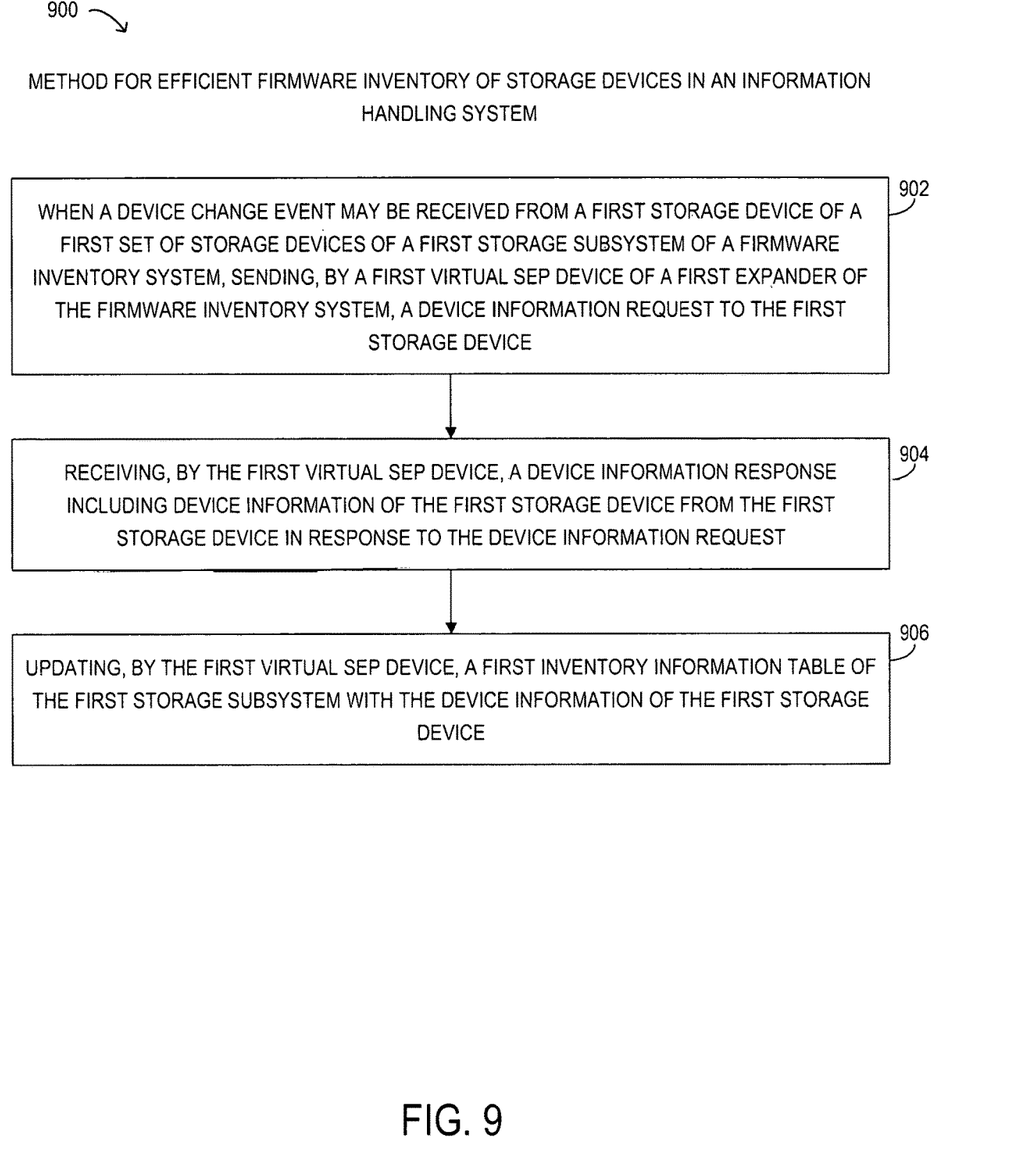
FIG. 9 is flowchart depicting selected elements of an embodiment of a method 900 for efficient firmware inventory of storage devices in an information handling system.

FIG. 9 is a flowchart depicting selected elements of an embodiment of a method 900 for efficient firmware inventory of storage devices in an information handling system. Method 900 may be performed by information handling system 100, firmware inventory system 200, firmware inventory system 300, firmware inventory system 500, firmware inventory system 500, previously described with reference to FIGS. 1, 2, 3, 4, and 5, or another information handling system. It is noted that certain operations described in method 900 may be optional or may be rearranged in different embodiments.

Method 900 may begin at step 902, by, when a physical link event may be received from a first storage device of a first set of storage devices of a first storage subsystem of a firmware inventory system, sending, by a first virtual SEP device of a first expander of the firmware inventory system, a device information request to the first storage device. At step 904, receiving, by the first virtual SEP device, a device information response including device information of the first storage device from the first storage device in response to the device information request. At step 906, updating, by the first virtual SEP device, a first inventory information table of the first storage subsystem with the device information of the first storage device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A firmware inventory system, comprising:
a first storage subsystem comprising:
a first set of storage devices, each storage device associated with a respective complex programmable logic device (CPLD);
a first inventory information table; and
a first expander comprising:
a first memory;
a first processor; and
a first virtual device stored in the first memory and executable by the first processor,
the first virtual device to:
when a device change event is received from a first storage device of the first set of storage devices:
send a device information request to a first CPLD associated with the first storage device;
receive a device information response including device information of the first storage device from the first CPLD associated with the first storage device in response to the device information request, including accessing a device presence bit of the first CPLD, the device presence bit indicating whether the first storage device is present in the first storage subsystem; and
update the first inventory information table with the device information of the first storage device based on an indication of the device presence bit whether the first storage device is present in the first storage subsystem or the first storage device is not present in the first storage subsystem;
a firmware inventory module to:
monitor disk microcode updates of the first storage device, including identifying a key value, a sense code value, and a sense code qualifier of the device firmware of the first storage device to identify an upgrade to a device firmware of the first storage device;
in response to identifying the upgrade to the device firmware of the first storage device:
sending an inquiry command to the first storage device; and
updating the first inventory table by setting a state indicator of the first storage device to indicate a stale value.

2. The firmware inventory system of claim 1, wherein the device change event comprises a physical link event that indicates that the first storage device has been inserted in the first storage subsystem, and wherein
the update of the first inventory information table further comprises the first virtual device to add a first storage device entry including the device information of the first storage device to the first inventory information table.

3. The firmware inventory system of claim 1, wherein the device change event comprises a physical link event that indicates that the first storage device has been removed from the first storage subsystem, and wherein
the update of the first inventory information table further comprises the first virtual device to remove a first storage device entry associated with the first storage device from the first inventory information table.

4. The firmware inventory system of claim 1, wherein each one of the first set of storage devices further comprises device firmware; and wherein the device change event comprises a device notification event that indicates that the device firmware of the first storage device has been updated.

5. The firmware inventory system of claim 1, wherein the first expander further comprises first expander firmware, and wherein the first virtual device further to:
when the first expander receives an expander firmware update event that indicates that the first expander firmware has been updated:
send a new device information request to each respective CPLD associated with the first set of storage devices;
receive a new device information response including new device information from each CPLD associated with each respective storage device of the first set of storage devices;
add a new storage device entry including the new device information for each respective storage device to a new inventory information table; and
replace the first inventory information table with the new inventory information table.

6. The firmware inventory system of claim 1, wherein the first virtual device further to:
when the first expander receives a first inventory information table request from an initiator application:
send a new device information request to each respective CPLD associated with the first set of storage devices;
receive a new device information response including new device information from each CPLD associated with each respective storage device of the first set of storage devices;
add a new storage device entry including the new device information for each respective storage device to the first inventory information table;
save the first inventory information table;
send a second inventory information table request to a second expander of a second storage subsystem of the firmware inventory system;
receive a second inventory table from the second expander;
merge the first inventory information table with the second inventory information table to create a merged inventory information table; and
send the merged inventory information table to the initiator application in response to the first inventory information table request.

7. The firmware inventory system of claim 1, wherein the device information of each storage device entry of the first inventory information table comprises a peripheral qualifier, a peripheral device type, a vendor identification, a product identification, a product revision level, a driver serial number, a vendor specific component identification, a drive slot number, and an enclosure bay identification.

8. A method, comprising:
when a device change event is received from a first storage device of a first set of storage devices of a first storage subsystem of a firmware inventory system:
sending, by a first virtual device of a first expander of the firmware inventory system, a device information request to a first complex programmable logic device (CPLD) associated with the first storage device;
receiving, by the first virtual device, a device information response including device information of the first storage device from first CPLD associated with the first storage device in response to the device information request, including accessing a device presence bit of the first CPLD, the device presence bit indicating whether the first storage device is present in the first storage subsystem;
updating, by the first virtual device, a first inventory information table of the first storage subsystem with the device information of the first storage device based on an indication of the device presence bit whether the first storage device is present in the first storage subsystem or the first storage device is not present in the first storage subsystem;
monitoring, by a firmware inventory module, disk microcode updates of the first storage device, including identifying a key value, a sense code value, and a sense code qualifier of the device firmware of the first storage device to identify an upgrade to a device firmware of the first storage device;
in response to identifying the upgrade to the device firmware of the first storage device:
sending, by the firmware inventory module, an inquiry command to the first storage device; and
updating, by the firmware inventory module, the first inventory table by setting a state indicator of the first storage device to indicate a stale value.

9. The method of claim 8, wherein the device change event comprises a physical link event that indicates that the first storage device has been inserted in the first storage subsystem, and wherein
updating the first inventory information table further comprises adding a first storage device entry including the device information of the first storage device to the first inventory information table.

10. The method of claim 8, wherein the device change event comprises a physical link event that indicates that the first storage device has been removed from the first storage subsystem, and wherein
updating the first inventory information table further comprises removing a first storage device entry associated with the first storage device from the first inventory information table.

11. The method of claim 8, wherein each one of the first set of storage devices further comprises device firmware, and wherein the device change event comprises a device notification event that indicates that the device firmware of the first storage device has been updated.

12. The method of claim 8, the method further comprising:
when an expander firmware update event is received that indicates that first expander firmware of the first expander has been updated:
sending a new device information request to each respective CPLD associated with the first set of storage devices;
receiving a new device information response including new device information from each CPLD associated with each respective storage device of the first set of storage devices;
adding a new storage device entry including the new device information for each respective storage device to a new inventory information table; and
replacing the first inventory information table with the new inventory information table.

13. The method of claim 8, the method further comprising:
when a first inventory information table request from an initiator application is received:
sending a new device information request to each respective CPLD associated with the first set of storage devices;

receiving a new device information response including new device information from each CPLD associated with each respective storage device of the first set of storage devices;

adding a new storage device entry including the new device information for each respective storage device to the first inventory information table;

saving the first inventory information table;

sending a second inventory information table request to a second expander of a second storage subsystem of the firmware inventory system;

receiving a second inventory table from the second expander;

merging the first inventory information table with the second inventory information table to create a merged inventory information table; and sending the merged inventory information table to the initiator application in response to the first inventory information table request.

14. The method of claim 8, wherein the device information of each storage device entry of the first inventory information table comprises a peripheral qualifier, a peripheral device type, a vendor identification, a product identification, a product revision level, a driver serial number, a vendor specific component identification, a drive slot number, and an enclosure bay identification.

15. A firmware inventory system, comprising:
a storage subsystem comprising:
a set of storage devices, each storage device associated with a respective complex programmable logic device (CPLD);
an inventory information table; and
a storage controller comprising:
a firmware inventory module stored in a memory of the storage controller and executable by a processor of the storage controller, the firmware inventory module to:
when the storage controller receives a device change event from a first storage device of the set of storage devices that indicates that device firmware of the first storage device has been updated:
send a device information request to a first CPLD associated with the first storage device;
receive a device information response including device information of the first storage device from the first CPLD associated with the first storage device in response to the device information request, including accessing a device presence bit of the first CPLD, the device presence bit indicating whether the first storage device is present in the first storage subsystem; and
update the inventory information table with the device information of the first storage device based on an indication of the device presence bit whether the first storage device is present in the first storage subsystem or the first storage device is not present in the first storage subsystem;
monitor disk microcode updates of the first storage device, including identifying a key value, a sense code value, and a sense code qualifier of the device firmware of the first storage device to identify an upgrade to a device firmware of the first storage device;
in response to identifying the upgrade to the device firmware of the first storage device:
sending an inquiry command to the first storage device; and
updating the first inventory table by setting a state indicator of the first storage device to indicate a stale value.

16. The firmware inventory system of claim 15, wherein, prior to the device information request being sent to the first storage device, the firmware inventory module to:
update a state indicator of the inventory information table to a stale value to indicate that the inventory information table is stale, and wherein,
after the inventory information table has been updated with the device information, the firmware inventory module to:
update the state indicator of the inventory information table to an updated value to indicate that the inventory information table is updated.

17. The firmware inventory system of claim 15, wherein the firmware inventory module further to:
when the storage controller receives the device change event that indicates that the first storage device has been inserted in the storage subsystem:
send the device information request to the first storage device;
receive the device information response including device information of the first storage device from the first storage device in response to the device information request; and
add a first storage device entry including the device information of the first storage device to the inventory information table.

18. The firmware inventory system of claim 15, wherein the firmware inventory module further to:
when the storage controller receives the device change event that indicates that the first storage device has been removed from the storage subsystem:
remove a first storage device entry associated with the first storage device from the inventory information table.

19. The firmware inventory system of claim 15, wherein the device information of each storage device entry of the first inventory information table comprises a peripheral qualifier, a peripheral device type, a vendor identification, a product identification, a product revision level, a driver serial number, a vendor specific component identification, a drive slot number, and an enclosure bay identification.

* * * * *